(12) United States Patent
Sims (10) Patent No.: US 8,641,061 B1
(45) Date of Patent: Feb. 4, 2014

(54) COLLAPSIBLE, TRANSPORTABLE CART FOR BUILDING MATERIALS

(76) Inventor: Dale W. Sims, Albuquerque, NM (US)

( * ) Notice: Subject to any disclaimer, the term of this patent is extended or adjusted under 35 U.S.C. 154(b) by 275 days.

(21) Appl. No.: 13/115,182

(22) Filed: May 25, 2011

Related U.S. Application Data (63) Continuation-in-part of application No. 12/629,304, filed on Dec. 2, 2009, now abandoned.

(51) Int. Cl.
*B62B 1/00* (2006.01)

(52) U.S. Cl.
USPC .................. 280/79.7; 280/651; 280/79.11

(58) Field of Classification Search
USPC ...................... 280/651, 79.7, 79.11
See application file for complete search history.

(56) References Cited

U.S. PATENT DOCUMENTS

| | | | | |
|---|---|---|---|---|
| 2,514,308 A | * | 7/1950 | Burg | 280/79.3 |
| 2,775,465 A | | 12/1956 | Swingler | |
| 3,582,102 A | | 6/1971 | Bewick | |
| 3,669,464 A | | 6/1972 | Linzmeier | |
| 4,165,088 A | | 8/1979 | Nelson | |
| 4,266,791 A | | 5/1981 | Myers | |
| 4,824,137 A | * | 4/1989 | Bolden | 280/652 |
| 4,856,810 A | * | 8/1989 | Smith | 280/639 |
| 4,953,878 A | | 9/1990 | Sbragia | |
| 5,037,117 A | | 8/1991 | Hershberger | |
| 5,228,716 A | * | 7/1993 | Dahl | 280/651 |
| 5,476,282 A | * | 12/1995 | Dahl | 280/651 |
| 5,584,635 A | | 12/1996 | Stapelmann | |
| 5,738,365 A | * | 4/1998 | McCarthy | 280/651 |
| 5,820,145 A | | 10/1998 | Osowski | |
| 5,871,219 A | | 2/1999 | Elliott | |
| 5,927,745 A | | 7/1999 | Cunningham | |
| 6,032,966 A | | 3/2000 | Young | |
| D439,719 S | * | 3/2001 | Kleinschmidt | D34/17 |
| 6,260,863 B1 | | 7/2001 | Orozco et al. | |
| 6,296,262 B1 | | 10/2001 | Skinner | |
| 6,454,282 B2 | | 9/2002 | Sexton et al. | |
| 6,579,051 B2 | | 6/2003 | Echternacht | |
| 6,729,632 B2 | * | 5/2004 | Ferrigan | 280/79.7 |
| 6,857,836 B2 | * | 2/2005 | Keller | 414/11 |
| 6,966,574 B1 | * | 11/2005 | Dahl | 280/651 |
| 7,014,413 B2 | * | 3/2006 | Young | 414/11 |
| 7,017,940 B2 | * | 3/2006 | Hatfull | 280/652 |
| 7,172,204 B1 | | 2/2007 | Tierney | |
| 7,780,389 B1 | * | 8/2010 | Young | 414/11 |

* cited by examiner

*Primary Examiner* — J. Allen Shriver, II
*Assistant Examiner* — James M Dolak
(74) *Attorney, Agent, or Firm* — Montgomery Patent & Design; Robert C Montgomery (57) ABSTRACT

A portable collapsible cart for building materials comprises a wheeled platform with selectable hinged upright supports that are collapsible, thereby forming a compact unit for storage of the device. The cart will support and transport various bulky building materials. The cart is easily maneuverable by a single person due to swivel casters and a narrow upright design. The cart collapses to a low profile for storage and also provides removably attachable racks for transportation of long linear objects.

19 Claims, 7 Drawing Sheets

COLLAPSIBLE, TRANSPORTABLE CART FOR BUILDING MATERIALS

RELATED APPLICATIONS

The present invention is a Continuation-in-Part of and claims the benefit of U.S. application Ser. No. 12/629,304, filed Dec. 2, 2009, now abandoned the entire disclosures of which are incorporated herein by reference.

FIELD OF THE INVENTION

The present invention relates generally to carts for material transportation, and more particularly, to a collapsible portable cart for transporting large sheet material such as building materials.

BACKGROUND OF THE INVENTION

As anyone who performs a lot of physical work will attest, nothing beats having the proper tool for a job. The proper tool can save time, save money, produce a higher quality job, reduce damage to equipment, and provide for the increased safety of the worker.

Material handling is common requirement for various tasks and various material handling devices exist in an attempt to facilitate ease of transporting tools, equipment, or materials from one (1) location to another. In most cases, tools and large equipment can simply be rolled to the worksite on wheels, but materials typically have to be manhandled to the site. Materials that are heavy, wide and thin such as doors, plywood panels, countertops and the like pose an additional problem of bulk and awkwardness. While a hand truck or other transporting cart can be used to move such items in wide open areas, they are of no use in narrow areas such as hallways. Additionally, these devices are prone to damaging these materials during transport and require a considerable amount of space to store or carry which often times may be limited when transporting large amounts of materials from job to job.

Some devices have attempted to provide specialized features to increase the versatility of the transporting cart. U.S. Pat. No. 3,669,464, issued in the name of Linzmeier, describes a material cart which automatically aligns elongated materials that are placed upon it. The Linzmeier cart has a wheeled horizontal bed with side members and guide rails which perform the automatic alignment.

U.S. Pat. No. 4,165,088, issued in the name of Nelson, describes a combination cart having a horizontal flat deck with a plurality of receiving apertures which receive combinations of differing tubular carrying means depending upon the use and materials to be transported.

U.S. Pat. No. 4,953,878, issued in the name of Sbragia, describes a collapsible cart used for carrying groceries or other similar materials. The Sbragia cart utilizes an upper compartment having sidewalls and a lower planer area which may be folded to permit ease in transportability when not in use.

U.S. Pat. No. 5,584,635, issued in the name of Stapelmann, describes a carriage for a construction panel having a wheeled base and with an articulating frame for supporting panel materials. The frame moves relative to the base between a reclined position used during transport and an upright position used during installation of the panel material.

While these devices may fulfill their respective, particular objectives, each suffers from one (1) or more aforementioned disadvantages or deficiencies. Accordingly, there exists a need for a means by which heavy, thin and wide building materials can be easily moved without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to easily and effectively transport large, heavy linear articles and thus, the object of the present invention is to solve the aforementioned disadvantages and provide for this need.

Another object of the present invention is to provide an easy to maneuver collapsible cart which is ideal transporting large sheet materials such as doors, plywood, drywall, countertops or the like to different locations without the risk of damaging the materials.

Another object of the present invention is to provide a versatile cart which can be utilized in a deployed configuration to transport large sheet materials or a substantially planer configuration to transport large articles such as furniture.

Yet still another object of the present invention is to provide a cart with a removable means of transporting long, thin articles such as rolled carpet, rods, or the like.

Yet still another object of the present invention is to provide a durable cart for handling materials which is easily and cost-effectively manufactured.

To achieve the above objectives, a feature of present invention provides a portable and collapsible cart for the transporting of materials comprising a substantially rigid and planer lower frame with at least one (1) wheel assembly, preferably attached to each corner. The lower frame has a rectangular configuration comprising an internal cavity with a depth defined by an upper horizontal surface and a lower horizontal surface. A left side supporting arm is pivotably connected to an interior vertical surface of the lower frame via a left side hinge mechanism, a right side supporting arm is pivotably connected to an interior vertical surface of the lower frame via a right side hinge mechanism, and a rear support brace is pivotably connected to an interior vertical surface of the lower frame via a rear hinge mechanism. The left side supporting arm and the right side supporting arm pivot about the lower frame in a direction perpendicular to a major axis of the lower frame. The rear support brace pivots about the lower frame in a direction parallel to the major axis of the lower frame. At least two (2) supporting braces are affixed to a lower edge of the lower frame perpendicular to the major axis of the lower frame.

Another feature of the present invention is to provide the rear support brace, the left side supporting arm, and the right side supporting arm further comprising a substantially vertical position relative to the lower frame defining a deployed configuration.

Another feature of the present invention is to provide the rear support brace, the left side supporting arm, and the right side supporting arm further comprising a substantially horizontal position relative to the lower frame defining a collapsed configuration.

Yet still another feature of the present invention is to provide hinge mechanisms which are mounted to the interior vertical surface of the lower frame at an offset distance such that the rear support brace and the side supporting arms unobstructedly pivot about the lower frame enabling the rear support brace and the side supporting arms to collapse into an interstitial area provided by an internal cavity of the lower frame. The cart further comprises a substantially planer horizontal surface when the rear support brace and the side supporting arms are in the substantially horizontal position.

Yet still another feature of the present invention is to provide the side supporting arms further comprising a structural supporting member pivotally connected to said lower frame and comprising an upper end and a lower end, a back supporting surface at a first inclined angle from horizontal and comprising an upper end connected to said structural supporting member with a first eyelet, a lower supporting surface perpendicularly connected to said back supporting surface, and a holding tab formed at a front portion of said lower end of said structural supporting member and connected to an end of said lower supporting surface opposing said back supporting surface for captivating said materials.

Yet still another feature of the present invention is to provide the side supporting arms further comprising a linear item support rack which is removably attached to the side supporting arms via an attachment means. Each of the linear item support racks further comprises at least one (1) perpendicularly attached support arm located at equivalent locations to provide an additional substantially horizontal support for linear materials.

Yet still another feature of the present invention is to provide the side at least one second eyelet affixed to at least one (1) support arm.

Yet still another feature of the present invention is to support and transport thin elongated material such as electrical wire rebar, or other similar material within the first eyelets and second eyelets.

The present invention provides a method of utilizing the transportable, collapsible cart that enables quick moving of many common building materials in a manner which quick, easy, effective and safe for both the user and the material.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 transportable and collapsible cart for building materials
15 lower frame section
20 swivel caster
25 locking lever
30 left side supporting arm
35 left side hinge mechanism
40 right side supporting arm
45 right side hinge mechanism
50 rear support brace
52 floor panel
54 angle bracket
55 rear hinge mechanism
56 rear support cross-member
58 rear support vertical member
70 back support member
75 lower support member
77 first eyelet
80 holding tab
85 stud knob fastener
90 receiving fastener
95 large sheet material
100 first inclined angle
110 first linear item support rack
111 first support rack vertical member
112 first upper collar
113 first lower bracket
120 support arm
140 long linear objects
150 second linear item support rack
151 second support rack vertical member
152 second upper collar
153 second lower bracket
154 lower support arm
155 upper support arm
157 second eyelet

DETAILED DESCRIPTION OF THE PREFERRED EMBODIMENT

Figure 3:
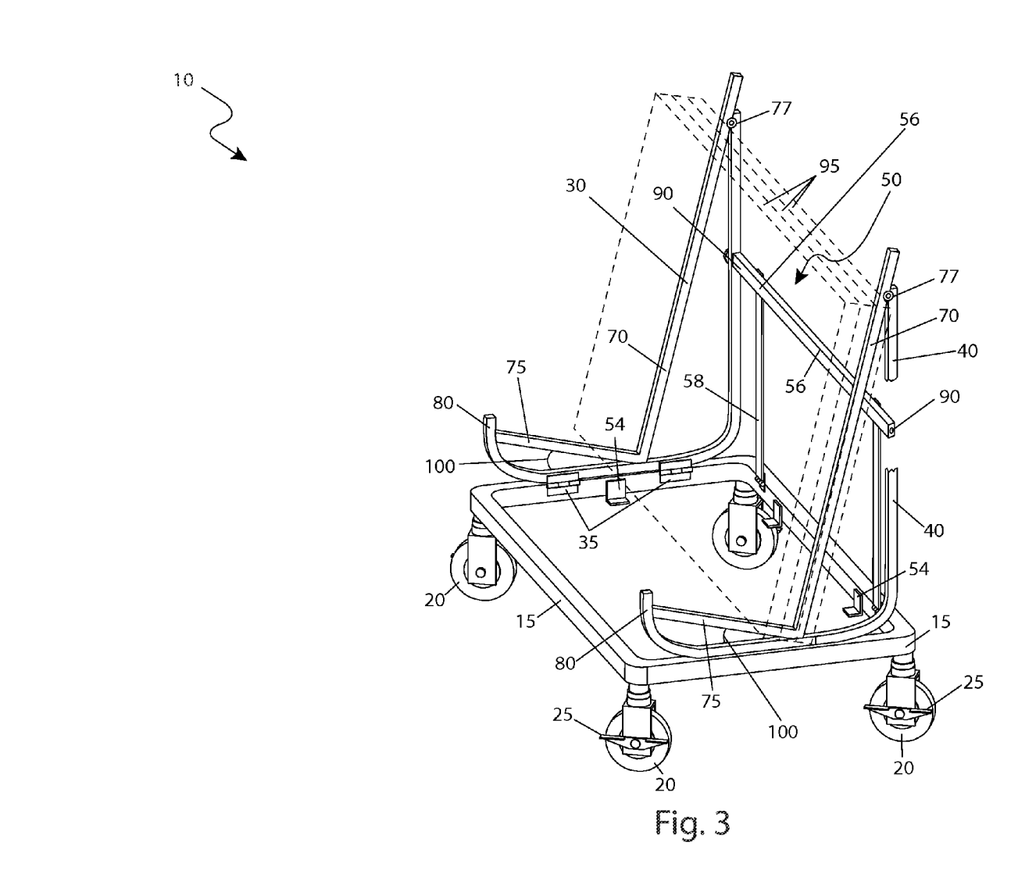
FIG. 3 is an isometric view of the transportable and collapsible cart for building materials 10, shown in a utilized state, according to the preferred embodiment of the present invention.
Figure 4A:
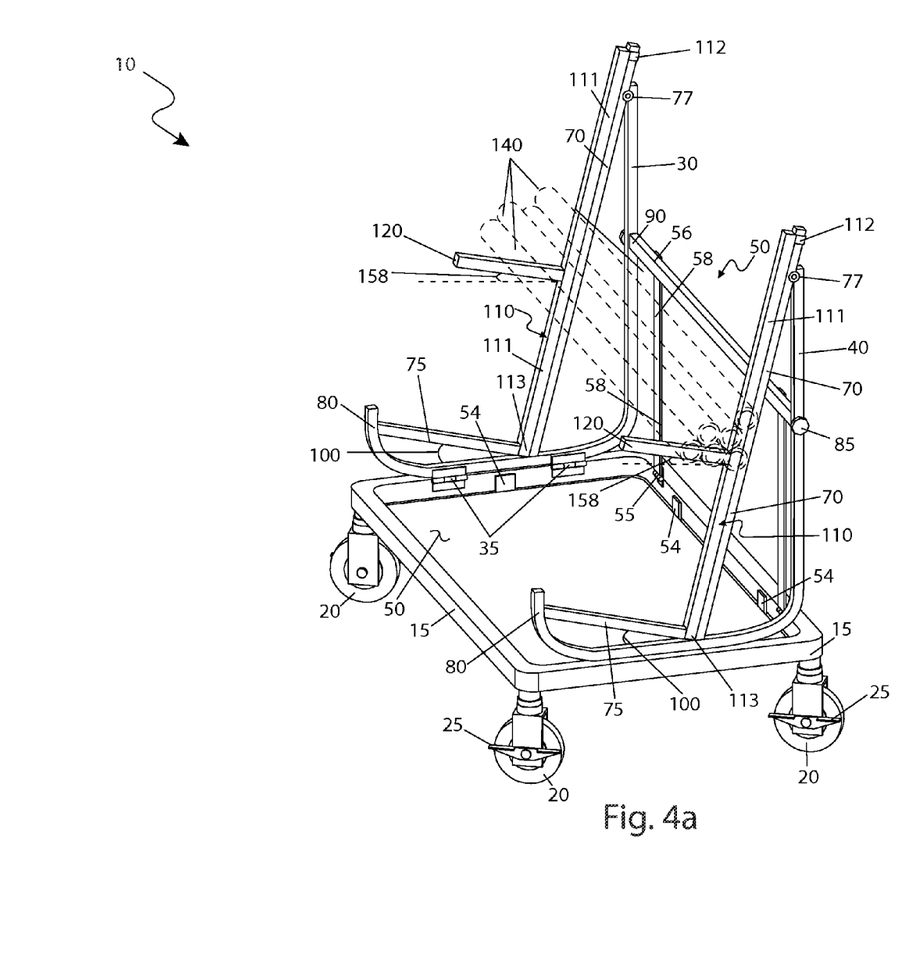
FIG. 4a is an isometric view of the transportable and collapsible cart for building materials 10, with a pair of first linear item support racks 110 attached, according to the preferred embodiment of the present invention.
Figure 4B:
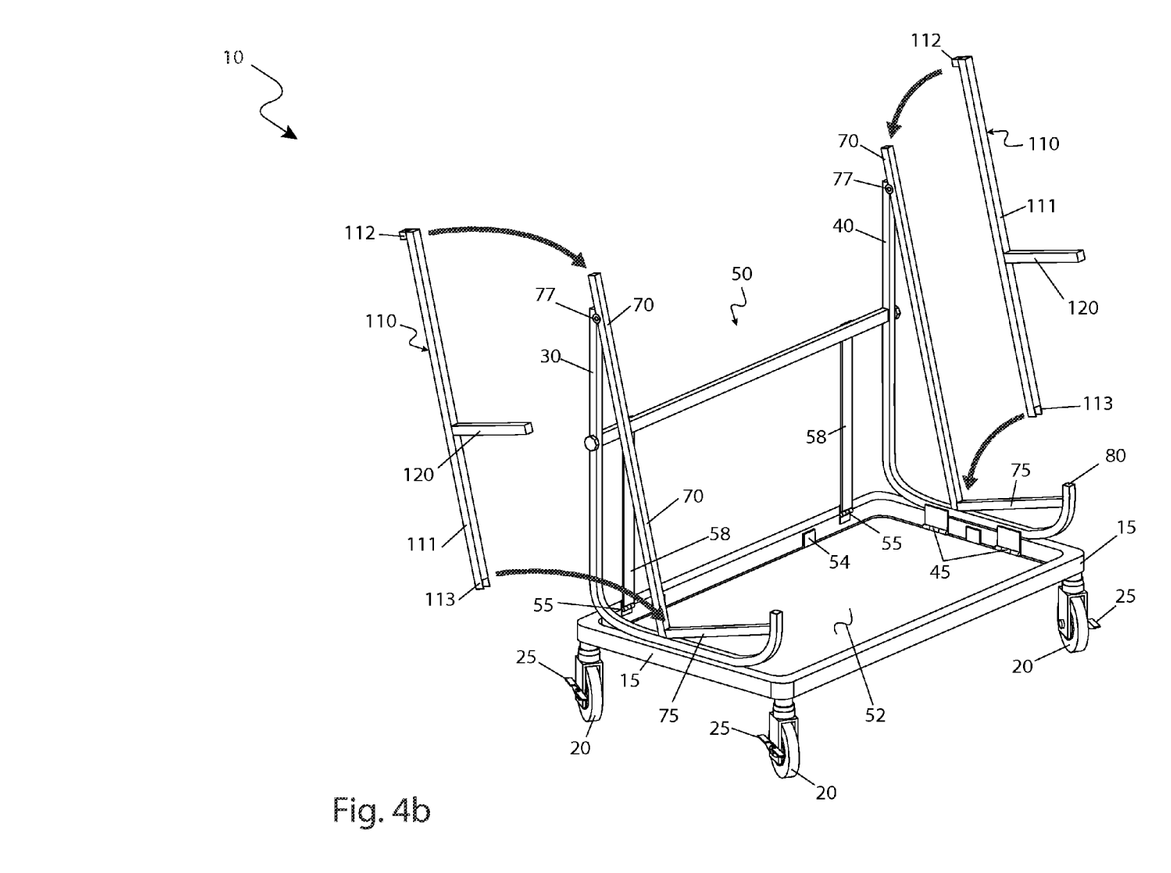
FIG. 4b is a partially exploded view of the transportable and collapsible cart for building materials 10, depicting attachment/detachment of the first linear item support racks 110, according to the preferred embodiment of the present invention.
Figure 4C:
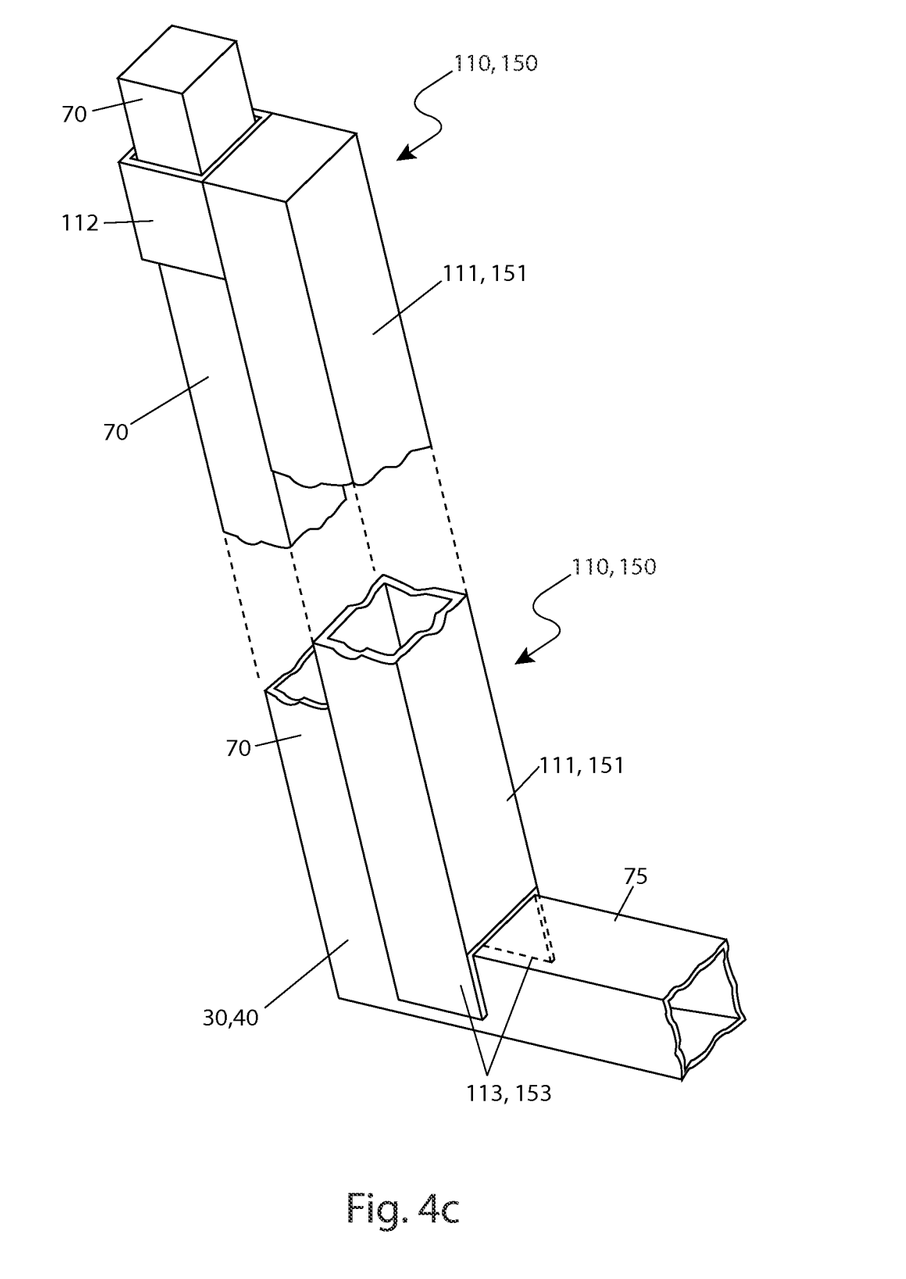
FIG. 4c is a close-up view of upper collar 112 and lower bracket 113 portions of the invention, according to the preferred embodiment of the present invention; and, FIG. 5 is an isometric view of a second linear item support rack portion 150 of the transportable and collapsible cart for building materials 10, according to the preferred embodiment of the present invention.
Figure 5:
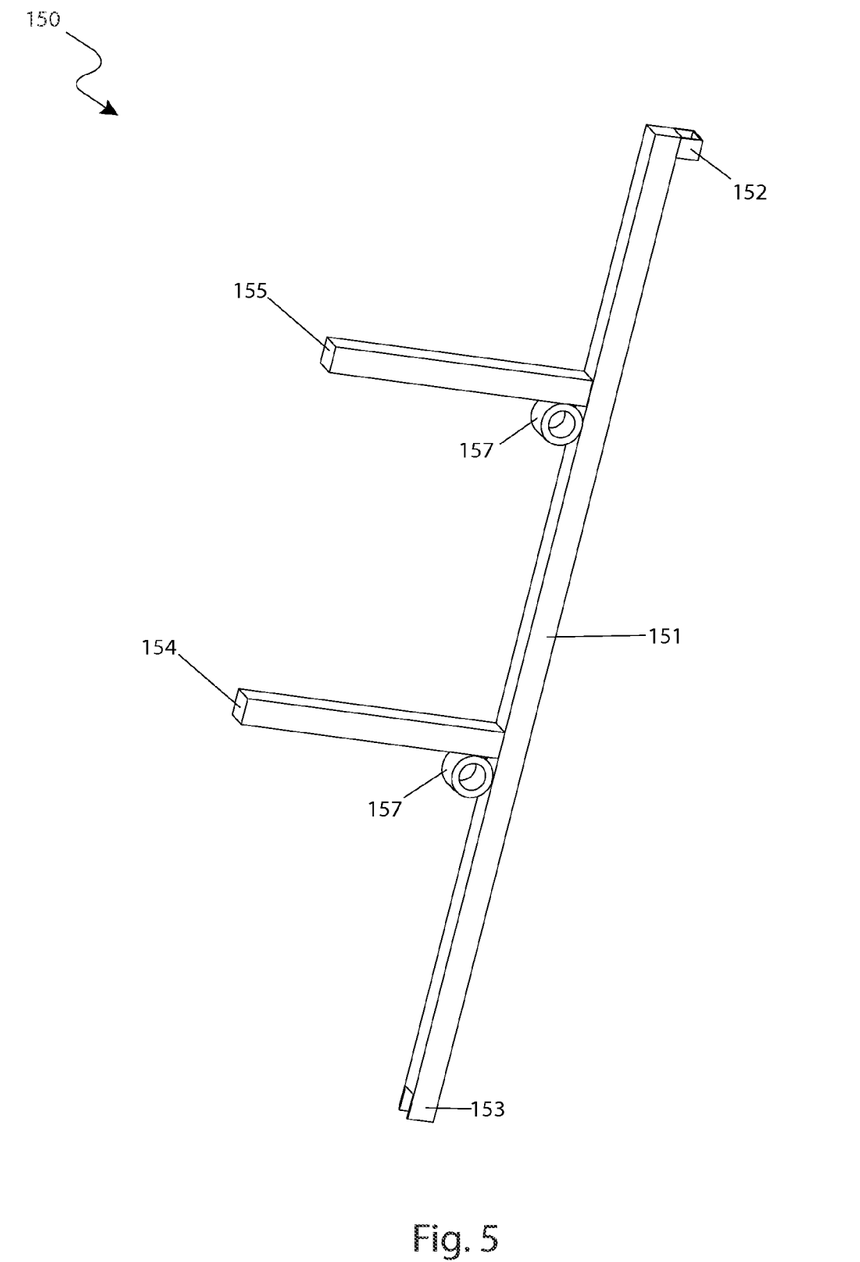

The best mode for carrying out the invention is presented in terms of its preferred embodiment, herein depicted within FIGS. 1 through 4c and in terms of an alternate embodiment, herein depicted within FIG. 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
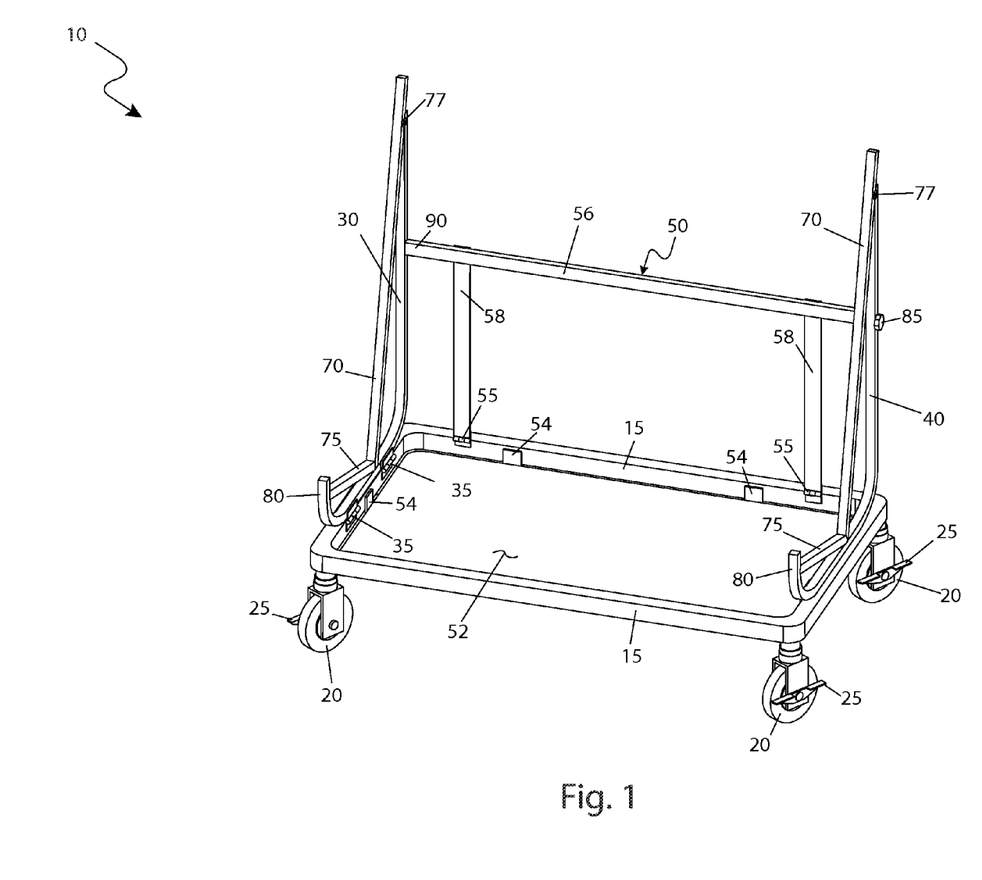
FIG. 1 is an isometric view of a transportable and collapsible cart for building materials 10, shown in a deployed and ready to utilize state, according to the preferred embodiment of the present invention.

Referring now to FIG. 1, an isometric view of the transportable and collapsible cart for building materials (herein described as the "apparatus") 10 shown here in a deployed and ready to utilize state according to the preferred embodiment of the present invention, is disclosed. The apparatus 10 comprises a lower frame section 15 and a removable/replaceable floor panel 52. The lower frame section 15 comprises a rectangularly-shaped horizontal structure made using tubular steel for strength and durability, although other materials of construction may be considered, and as such, should not be interpreted as a limiting factor of the present invention. The lower frame section 15 comprises a plurality of inwardly protruding welded right-angle brackets 54 which provide a support means to the floor panel 52, allowing said floor panel 52 to lay flat within the lower frame section 15, thereby providing a flat surface capable of supporting various materials and equipment during use. The floor panel 52 is envisioned to be made using plywood or equivalent load-bearing material.

The apparatus 10 comprises four (4) swivel casters 20, each located at each corner portion of the lower frame section 15 to provide support and maneuverability of the apparatus 10. The swivel casters 20 allow the apparatus 10 to travel in any direction, thereby allowing the apparatus 10 to travel down narrow passageways and navigate tight turns and corners. Each swivel caster 20 is provided with a locking lever 25 to hold the apparatus 10 in position when loading or unloading materials and supplies.

The apparatus 10 comprises a "J"-shaped left side-supporting arm 30 which is connected along a bottom edge to the lower frame section 15 via a pair of left side hinge mechanisms 35. Likewise, a "J"-shaped right side-supporting arm 40 is connected to an opposing side surface of the lower frame section 15 via a pair of right side hinge mechanisms 45. Finally, a rear support brace 50 is connected to a rear edge of the lower frame section 15 via a pair of rear hinge mechanisms 55. The left side hinge mechanisms 35, the right side hinge mechanisms 45 and the rear hinge mechanisms 55 are vertically offset in their construction and mounting position upon said lower frame section 15 so as to facilitate collapsing of the left side supporting arm 30, the right side supporting arm 40, and the rear support brace 50, compactly against the floor panel 52 for compact transporting and/or storage of the apparatus 10 (see FIG. 2).

The rear support brace 50 comprises a rear-mounted unitary weldment which spans across, and supportingly attaches to the left side 30 and right side 40 supporting arms via respective stud knob fasteners 85, thereby forming a three-sided load-bearing enclosure. The rear support brace 50 further comprises a rear brace cross-member 56 and a pair of rear support vertical members 58 which further comprise the rear hinge mechanisms 55 at bottom end portions.

The left side supporting arm 30 and the right side supporting arm 40 are each equipped with an integrally-welded back support member 70 and lower support member 75. Each back 70 and lower 75 support member pair is welded together forming a relative angle of approximately ninety degrees (90°) being also welded to the left 30 and right 40 side supporting arms at a rearwardly inclined angle 100 of approximately ten degrees) (10°. The left 30 and right 40 side support arms are arranged in a parallel manner, thereby allowing a quantity of large sheet materials 95 to lean against said back 70 and lower 75 support member portions in a stable manner (see FIG. 3). The back 70 and lower 75 support members define combined planar rear and bottom surfaces onto which said large sheet materials 95 may be placed. Furthermore, the lower end portion of each left 30 and right 40 side support arm, terminates slightly above respective lower support members 75 to form an upwardly extending holding tab 80 which acts to safely restrain loaded large sheet materials 95 upon said lower support members 75. Said back 70 and lower 75 support members aid in retention of planar large sheet materials 95 such as sheets of drywall, sheets of plywood, doors, and other similar building materials, folded folding tables, and the like.

The left side 30 and right side 40 supporting arms provide a welded attachment to respective back support members 70 via respective integrated joining first eyelets 77. The two (2) first eyelets 77 are located approximately six (6) inches below a top end portion of each back support member 70 being arranged along a common axis, thereby enabling insertion of an elongated rod, onto which spools of wire or similar materials may be hung.

The left side supporting arm 30 and the right side supporting arm 40 are affixed to the rear support brace 50 via respective stud knob fasteners 85 being mounted to outward-facing surfaces of said left side 30 and right side 40 supporting arms. The stud knob fasteners 85 comprise commercially-available hand-operated stud knob components having threaded shafts which penetrate through said left side 30 and right side 40 supporting arms and protrude inwardly from inner surfaces of said left side 30 and right side 40 supporting arms and in turn threadingly engaging corresponding threaded receiving fastener portions 90 being integrated into end portions of the rear brace cross-member portion 56 of the rear support brace 50. However, other methods of fastening said left side 30 and right side 40 supporting arms to the rear support brace 50 such as latches, clamps, locking levers, and the like, could also be utilized with equal effectiveness and as such, should not be interpreted as a limiting factor of the present invention. The removable attachable function of the stud knob fasteners 85 and the receiving fasteners 90 allow easy detachment of the left 30 and right 40 side supporting arms from the rear support brace 50, thereby allowing said portions to pivot downwardly and lie flat upon the floor panel 52. The materials of construction are to provide the apparatus 10 with a weight carrying capacity of approximately one-thousand (1000) pounds.

Figure 2:
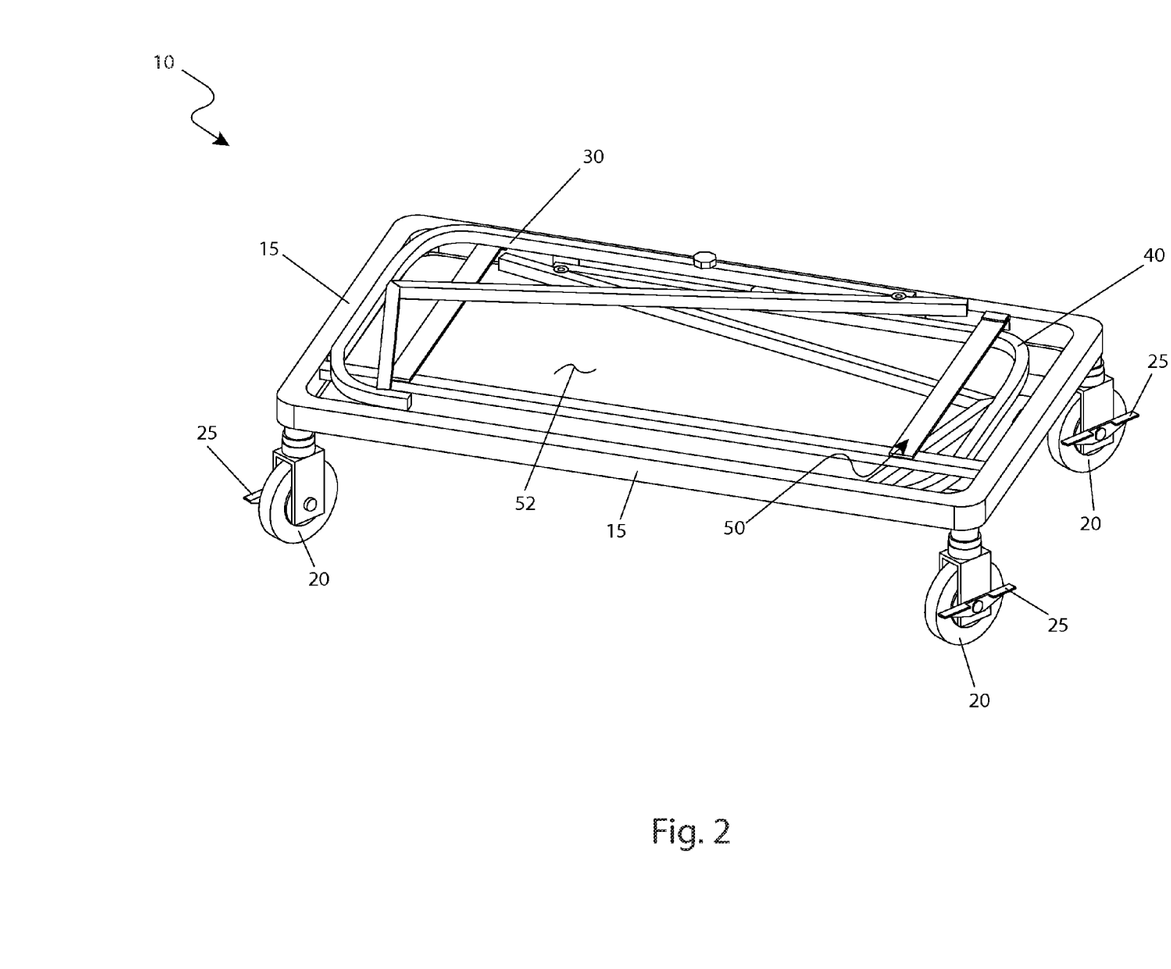
FIG. 2 is an isometric view of the transportable and collapsible cart for building materials 10, shown in a collapsed state, according to the preferred embodiment of the present invention.

Referring next to FIG. 2, an isometric view of the apparatus 10, shown in a folded or retracted state, according to the preferred embodiment of the present invention, is depicted. This figure more clearly discloses the apparatus 10 in its collapsed state as the left side supporting arm 30, the right side supporting arm 40, and the rear support brace 50 have been pivoted inwardly and are resting upon the recessed floor panel 52 within the lower frame section 15. Additionally, the compact and compressed shape of the apparatus 10 depicts the ease upon which the apparatus 10 may be picked up and carried, such as up and down stairs, as well as the ease upon which the apparatus 10 can be stored in a small location, either by lying the apparatus 10 flat, or standing it up on end.

Referring now to FIG. 3, an isometric view of the apparatus 10, shown in a utilized state, according to the preferred embodiment of the present invention, is disclosed. The floor panel 52 has been removed from this figure to better illustrate the supporting angle brackets 54. The angle brackets 54 provide bottom support to the floor panel 52 (see FIG. 1). Said angle brackets 54 comprise a plurality of right-angle members arranged in an equally-spaced manner and welded along inwardly-facing surfaces of the lower frame section 15, thereby allowing the removable floor panel 52 to lay flat.

This figure more clearly displays the ability of the apparatus 10 to store and transport a quantity of large sheet materials 95. The large sheet materials 95 can be of various shapes and/or sizes, but are most likely to be sheets of plywood, sheets of drywall, sheets of paneling, collapsed folding tables, countertops, doors, or the like. The quantity of large sheet materials 95 that are held by the apparatus 10 is limited by the length of the lower support member 75 between the back support member 70 and the holding tab 80. The large sheet materials 95 are positioned on the lower support member 75 at the first inclined angle 100 envisioned to be approximately ten degrees (10°). Such a configuration of the back 70 and lower 75 support members positions the large sheet materials in a slightly inclined and generally upright orientation enabling easy maneuvering down narrow hallways, on and off elevators, up to loading docks, and the like. Additionally, a forklift may be utilized to manipulate the apparatus 10 along with loaded materials, for placement at different elevations. Normal movement of the apparatus 10 upon the swivel casters 20 is provided by applying manual hand pressure to the apparatus 10 and/or the large sheet materials 95 to obtain motion in a desired direction.

Referring now to FIGS. 4a, 4b, and 4c, various views of a first linear item support rack 110 attached to the apparatus 10, according to the preferred embodiment of the present invention, is disclosed. The first linear item support rack 110 is provided in pairs and is attached to respective left side supporting arm 30 and right side supporting arm 40 portions. Each first linear item support rack 110 comprises a first support rack vertical member 111 and a support arm 120. Said front support rack vertical member 111 comprises a length of rectangular tubing providing perpendicular welded attachment of the support arm 120, an integral first upper collar 112, and an integral first lower bracket 113. The first upper collar 112 comprises a rectangular section of tubing being welded to a side surface being particularly sized to snuggly fit over a top end portion of the back support member 70. The first lower bracket 113 comprises a pair of parallel welded appendages separated so as to snuggly fit over and laterally engage the lower support member 75. In use, the first upper collar 112 and first lower bracket 113 engage respective back support 70 and lower support 75 members in a coincidental manner to secure the first linear item support rack 110 in place upon said left side 30 and right side 40 supporting arms. Other methods of attaching the first linear item support rack 110 such as screws, bolts, locking levers and the like can also be considered due to their equivalent functionality, and as such, should not be interpreted as a limiting factor of the present invention.

Each first linear item support rack 110 comprises a single support arm 120 capable of supporting a quantity of linear building materials 140. The support arm 120 is welded to and made of similar materials as the first support rack vertical member 111, and extends in a generally perpendicular direction outwardly from an intermediate location upon the first support rack vertical member portion 111. Each support arm 120 of the pair of first support rack 110, when installed on both left side 30 and right side 40 supporting arms is provided at a common equivalent elevation along a common plane, thereby supporting said linear building materials 140 at a stable horizontal orientation. The support arm 120 extends outwardly from the first support rack vertical member 111 parallel to the subjacent lower support member 75. The inclination of the support arm 120 aids in the retaining of long linear objects 140 such as pipe, conduit, metal rods, rolled carpet and other long linear items commonly used in the building and construction trades.

The linear item support racks 110, 150 are designed to remain attached to the back support member 70 when folded downwardly against the floor panel 52 as an extension of said back support member 70.

Referring now to FIG. 5, an isometric view of a second linear item support rack 150, according to an alternate embodiment of the present invention, is disclosed. The apparatus 10 may be configured in various manners providing particular usefulness to different trades and applications. The second linear item support rack 150 is envisioned to be utilized as a pair of units to provide specialized features suitable to electrical conduit installation. Said second linear item support rack 150 comprises welded-on features including a pair of support arms 120 and a pair of second eyelets 157. The support arms 120 are affixed at different elevations along the second support rack vertical member 151 and having a respective second eyelet 157 welded at an intersection of said second support rack vertical member 151 and a bottom surface of the support arm 120, thereby acting as a receiving means for a long rod onto which spools of wire or similar materials may be hung. It is further understood that additional linear item support racks may be configured with various specialized features particularly suitable to other trades and projects without deviating from the concept and as such should not be interpreted as a limiting factor of the apparatus 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. It is envisioned that the apparatus 10 would be constructed and utilized in general accordance with FIG. 1 through FIG. 4c, as well as with the alternate second linear item support rack 150 shown on FIG. 5.

Upon initial utilization of the apparatus 10, it would be decided upon which configuration of the apparatus 10 would be needed. For large sheet materials 95 such as drywall, sheets of plywood, doors, and other similar building materials, folded folding tables, and the like, the apparatus 10 would be configured and utilized as shown in FIGS. 1 and 3. For long linear objects 140 such as molding, pipe, conduit, rolled carpeting and the like, the apparatus 10 would be configured and utilized as shown in FIG. 4a.

The method of configuring and utilizing the preferred embodiment of the apparatus 10 may be achieved by performing the following steps: deploying the left side supporting arm 30, the rear support brace 50, and the right side supporting arm 40 in a sequential manner by pivoting said portions upwardly via respective left side hinge mechanisms 35, rear hinge mechanisms 55, and right side hinge mechanisms 45; threadingly engaging the two (2) stud knob fasteners 85 into the corresponding receiving fastener portions 90 of the rear support brace 50; placing and leaning a quantity of large sheet materials 95 onto the back 70 and lower 75 support members; pushing and therefore motioning the apparatus 10 in any desired direction using the omni-directional function of the swivel casters 20; motioning the apparatus 10 preferably in a direction being perpendicular to a short side of the lower frame section 15, thereby allowing easy transporting of the apparatus 10 and loaded materials 95 down long narrow passageways such as hallways, and through doorways; arriving at an unloading destination; securing the apparatus 10 in place along a floor surface by locking the swivel casters 20 using the locking levers 25; unloading said large sheet materials 95 in an expected manner; repeating the above loading, transporting, and unloading process until a desired quantity of large sheet materials 95 has been moved; collapsing the apparatus 10 by loosening and disengaging the stud knob fasteners 85 from the receiving fasteners 90; sequentially folding the right side supporting arm 40, the rear support brace 50, and the left side supporting arm 30 downward against the floor panel 52; motioning the apparatus 10 either using the swivel casters 20 or picking up and carrying the apparatus 10 in a collapsed and compact form to a storage location until needed again; and, benefiting from a compact, maneuverable, and convenient means of transporting a large quantity of building materials 95, afforded a user of the present invention 10.

The method of configuring and utilizing the apparatus 10 when used in conjunction with attached support racks 110, 150 may be achieved by performing the following steps: deploying and securing the left side supporting arm 30, the rear support brace 50, and the right side supporting arm 40 as previously described above; attaching the first linear item support racks 110 or second linear item support racks 150 to the supporting arms 30, 40, based upon a particular application or project, by coincidentally engaging the upper collar 112 and lower bracket 113 portions of each support rack 110, 150 with respective back 70 and lower 75 support members; utilizing the apparatus 10 to perform particular functions and tasks specific to a trade, project, or function, as desired; and, collapsing and storing the apparatus 10 as previously described.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A portable and collapsible cart for transporting materials comprising:
    a substantially rigid and planar lower frame having a rectangular configuration comprising an internal cavity in which a depth is defined by an upper horizontal surface and a lower horizontal surface;
    at least one wheel assembly attached to each corner of said lower frame;
    a left side supporting arm pivotably connected to an interior vertical surface of said lower frame via a left side hinge mechanism;
    a right side supporting arm pivotably connected to an interior vertical surface of said lower frame via a right side hinge mechanism;
    wherein said left side supporting arm and said right side supporting arm pivots about said lower frame perpendicular to a major axis of said lower frame;
    a rear support brace pivotably connected to an interior vertical surface of said lower frame via a rear hinge mechanism;
    wherein said rear support brace pivots about said lower frame parallel to said major axis of said lower frame; and,
    at least two supporting braces affixed to a lower edge of said lower frame perpendicular to said major axis of said lower frame;
    wherein said rear support brace, said left side supporting arm, and said right side supporting arm further comprise a substantially vertical position relative to said lower frame defining a deployed configuration;
    wherein said rear support brace, said left side supporting arm, and said right side supporting arm further comprise a substantially horizontal position relative to said lower frame defining a collapsed configuration; and,
    wherein said rear support brace and said side supporting arms, when pivoted to said substantially horizontal position, further comprise a substantially flat configuration captivated within an interstitial area provided by said internal cavity.

2. The cart of claim 1, wherein said left side supporting arm and said right side supporting arm are removably attached to opposing sides of said rear support brace via an engagement means.

3. The cart of claim 2, wherein said engagement means further comprises a threaded fastener through said side supporting arms which engages a threaded receiving location on said rear support brace.

4. The cart of claim 1, wherein said wheel assemblies further comprise three-hundred-sixty degrees of rotation thereabout an axis perpendicular to the lower frame;
    wherein said rotation enables said cart to freely travel in any direction.

5. The cart of claim 1, wherein each of said wheel assemblies further comprises an actuatable locking lever for selectively immobilizing said wheel assembly during a loading or an unloading of said materials.

6. The cart of claim 4, wherein each of said wheel assemblies further comprises an actuatable locking lever for selectively immobilizing said wheel assembly during a loading or an unloading of said materials.

7. The cart of claim 1, wherein said supporting braces provide support to said rear support brace, said left side supporting arm, and said right side supporting arm when pivoted to said substantially horizontal position.

8. The cart of claim 1, wherein said hinge mechanisms are mounted to said interior vertical surface of said lower frame at an offset distance such that said rear support brace and said side supporting arms unobstructedly pivot about said lower frame, thereby enabling said rear support brace and said side supporting arms to collapse into an interstitial area provided by said internal cavity of said lower frame;
    wherein said cart further comprises a substantially planar horizontal surface when said rear support brace and said side supporting arms are in said substantially horizontal position.

9. The cart of claim 1, wherein each side supporting arm further comprises:
    a structural supporting member pivotally connected to said lower frame, comprising an upper end and a lower end;
    a back supporting surface at a first inclined angle from horizontal, comprising an upper end connected to said structural supporting member with an eyelet;
    a lower supporting surface perpendicularly connected to said back supporting surface; and,
    a holding tab formed at a front portion of said lower end of said structural supporting member and connected to an end of said lower supporting surface opposing said back supporting surface for captivating said materials;
    wherein said eyelet assists in captivating elongated material therein.

10. The cart of claim 1, wherein each of said side supporting arms further comprises a linear item support rack;

wherein each of said linear item support racks removably attach to said side supporting arms via an attachment means; and, wherein each of said linear item support racks further comprises at least one perpendicularly attached support arm located at equivalent locations to provide an additional substantially horizontal support for linear materials; and, wherein said support arm further comprises a second inclined angle from horizontal.

11. The cart of claim 10, wherein said support arm further comprises at least one eyelet affixed to said at least one support arm;

wherein said eyelet assists in captivating elongated material therein.

12. The cart of claim 1, wherein said cart provides a maximum load capacity comprising one thousand pounds.

13. A portable and collapsible cart for transporting materials comprising:

a substantially rigid and planar lower frame having a rectangular configuration comprising an internal cavity in which a depth is defined by an upper horizontal surface and a lower horizontal surface;

at least four casters attached to each corner of said lower frame comprising three-hundred-sixty degrees of rotation about an axis perpendicular to the lower frame enabling said cart to freely travel in any direction;

a left side supporting arm pivotably connected to an interior vertical surface of said lower frame via a left side hinge mechanism;

a right side supporting arm pivotably connected to an interior vertical surface of said lower frame via a right side hinge mechanism;

wherein said left side supporting arm and said right side supporting arm pivots about said lower frame perpendicular to said major axis;

a rear support brace pivotably connected to an interior vertical surface of said lower frame via a rear hinge mechanism;

wherein said rear support brace pivots about said lower frame parallel to said major axis;

wherein said left side supporting arm and said right side supporting arm are removably attached to opposing sides of said rear support brace via a mechanical fastener;

wherein each side supporting arm further comprises a structural supporting member pivotally connected to said lower frame and comprises an upper end and a lower end, a back supporting surface at a first inclined angle from horizontal comprising an upper end connected to said structural supporting member with a first eyelet for captivating elongated materials therein, a lower supporting surface perpendicularly connected to said back supporting surface, and a holding tab formed at a front portion of said lower end of said structural supporting member and connected to an end of said lower supporting surface opposing said back supporting surface for captivating said materials; and, at least two supporting braces affixed to a lower edge of said lower frame perpendicular to a major axis of said lower frame;

wherein said supporting braces provide support to said rear support brace, said left side supporting arm, and said right side supporting arm when pivoted to said substantially horizontal position;

wherein said rear support brace, said left side supporting arm, and said right side supporting arm further comprise a substantially vertical position relative to said lower frame defining a deployed configuration; and, wherein said rear support brace, said left side supporting arm, and said right side supporting arm further comprise a substantially horizontal position relative to said lower frame defining a collapsed configuration;

wherein said rear support brace and said side supporting arms further comprise a substantially flat configuration captivated within an interstitial area provided by said internal cavity of said lower frame when in said substantially horizontal position defining said collapsed configuration.

14. The cart of claim 13, wherein said mechanical fastener further comprises a threaded fastener through said side supporting arms which engages a threaded receiving location thereon said rear support brace.

15. The cart of claim 13, wherein each of said casters further comprises an actuatable locking lever for selectively immobilizing said casters during a loading or an unloading of materials.

16. The cart of claim 13, wherein said hinge mechanisms are mounted to said interior vertical surface of said lower frame at an offset distance such that said rear support brace and said side supporting arms unobstructedly pivot about said lower frame, thereby enabling said rear support brace and said side supporting arms to collapse into said interstitial area;

wherein said cart further comprises a substantially planar horizontal surface when said rear support brace and said side supporting arms are in said substantially horizontal position.

17. The cart of claim 13, wherein each of said side supporting arms further comprises a linear item support rack;

wherein each of said linear item support racks removably attach to said side supporting arms via an attachment means;

wherein each of said linear item support racks further comprises at least one perpendicularly attached support arm located at equivalent locations to provide an additional substantially horizontal support for additional linear materials; and, wherein said support arm further comprises a second inclined angle from horizontal.

18. The cart of claim 13, wherein said support arm further comprises at least one second eyelet affixed to said at least one support arm;

wherein said second eyelet assists in captivating elongated material therein.

19. The cart of claim 13, wherein said cart provides a maximum load capacity comprising one thousand pounds.

* * * * *